(12) United States Patent
O'Byrne

(10) Patent No.: US 7,223,466 B2
(45) Date of Patent: May 29, 2007

(54) FIBER REINFORCED RESIN ASSEMBLY

(75) Inventor: Kilian O'Byrne, Cambridge (GB)

(73) Assignee: Hexcel Composites Limited, Duxford, Cambridge (GB)

( * ) Notice: Subject to any disclaimer, the term of this patent is extended or adjusted under 35 U.S.C. 154(b) by 365 days.

(21) Appl. No.: 11/031,190

(22) Filed: Jan. 7, 2005

(65) Prior Publication Data

US 2005/0163989 A1 Jul. 28, 2005

(30) Foreign Application Priority Data

Jan. 10, 2004 (GB) ................................. 0400475.0

(51) Int. Cl.
*B32B 13/02* (2006.01)
*B32B 27/04* (2006.01)

(52) U.S. Cl. .................. 428/297.4; 428/297.7
(58) Field of Classification Search ............ 428/297.4, 428/297.7; 442/286, 394
See application file for complete search history.

(56) References Cited

U.S. PATENT DOCUMENTS

| | | | |
|---|---|---|---|
| 2,999,834 A | | 9/1961 | Wismer |
| 3,666,615 A | | 5/1972 | Iwai et al. |
| 4,842,667 A | * | 6/1989 | Thorsted, Jr. ............... 156/166 |
| 5,312,651 A | * | 5/1994 | Takada et al. ............... 427/386 |
| 5,350,826 A | * | 9/1994 | Watanabe et al. ............ 528/93 |
| 5,677,045 A | * | 10/1997 | Nagai et al. ................. 442/294 |
| 6,399,199 B1 | * | 6/2002 | Fujino et al. ............... 428/396 |
| 6,770,362 B2 | * | 8/2004 | Okano ......................... 428/357 |
| 6,787,237 B2 | * | 9/2004 | Simmons et al. ........... 428/413 |

FOREIGN PATENT DOCUMENTS

| | | |
|---|---|---|
| EP | 0545640 A | 9/1993 |
| EP | 076673 B2 | 10/1993 |
| EP | 0424833 B1 | 3/1996 |
| EP | 0939099 A | 1/1999 |
| EP | 0906927 A | 7/1999 |
| EP | 1072634 A | 1/2001 |
| EP | 1300507 A | 3/2004 |
| EP | 1300507 A | 3/2004 |
| EP | 1393884 A | 3/2004 |
| JP | 05293205 A | 11/1993 |
| JP | 07090097 A | 4/1995 |
| JP | 10202814 A | 8/1998 |

OTHER PUBLICATIONS

Tyberg et al., Latent nucleophilic initiators for melt processing phenolic-epoxy matrix composites. Polymer 41 (2000) pp. 9033-9048.

* cited by examiner

*Primary Examiner*—N. Edwards

(57) ABSTRACT

An uncured fiber reinforced assembly that includes a reinforcement layer containing a fibrous material and at least one highly reactive curing agent. A matrix film layer is applied to the reinforcement layer so that it does not substantially impregnate the reinforcement layer. The matrix film layer includes at least one uncured epoxy resin and at least one latent epoxy curing agent. The assembly is designed for use in making snowboards and skis.

7 Claims, 2 Drawing Sheets

FIBER REINFORCED RESIN ASSEMBLY

BACKGROUND OF THE INVENTION

1. Field of the Invention

The present invention relates to a fiber reinforced resin assembly.

2. Description of Related Art

Fiber reinforced resin assemblies are widely used as structural components, in industrial and leisure applications. These assemblies are generally supplied as a prepreg. Prepreg materials comprise a fibrous reinforcement phase together with a matrix resin comprising one or more resinous materials, one or more curing agents and optionally other additives such as accelerators, tougheners, flame retardants, fillers and the like forming together a so-called matrix resin. The matrix resin can generally be cured at temperatures in the range from 50° C. to 200° C.

The period of time in which a prepreg remains handleable with properties intact outside the specified storage environment, normally a cold store or freezer, is called out-time or out-life. Known prepregs have limited out-life in their uncured state at room temperature. This is particularly evident in low temperature cure thermoset matrix resin compositions where the curing agents used to achieve cure at these low temperatures, typically between 50 and 100° C., react with the resins even at ambient temperatures. For example, a matrix resin composition consisting of an epoxy resin and an imidazole curing agent that can be cured at 60° C., can have a room temperature stability of less than two days rendering it unusable thereafter. Stability during storage at ambient temperatures is important, especially if materials are to be transported long distances, and/or stored at ambient temperatures before use. It is, of course, possible to store these known prepregs at temperatures below room temperature to enhance their shelf-life, but the need for large or expensive refrigeration units can make this option undesirable.

For certain applications it is desirable that assemblies have an out-life of at least two weeks; this is particularly true where the assemblies find utility in sports applications, and more particularly in the ski/snowboard industry. Furthermore, it is desirable that the assembly has a certain degree of tack. Tack, which is a measure of the adhesion of a prepreg ply to the tool surfaces or to other prepreg plies in the assembly, is an adhesion characteristic of the matrix resin that is controlled in order to facilitate ply cutting and lay-up operations. The plies should be capable of being removed and repositioned if necessary. For application in the ski/snowboard industry the assembly ideally has a tack level that is almost dry to touch, but the resin is flexible enough to permit the material to be wound around mandrels without cracking. The term "leathery" is sometimes used to describe such a tack level. Several tests are available that can be used for semi-quantitative measurement of tackiness. One such test uses a Meedus Datatac Analyser. This instrument consists of a sensor head assembly that contains a precision load cell, which converts the tack force on eight sensor probes into an electric signal. A control console accepts this signal and processes it into stored analogue and digital peak values.

Attempts have been made to prolong the out-life of assemblies of the kind referred to herein. For example, U.S. Pat. No. 2,999,834 refers to the application of a composition comprising a polymerization catalyst embedded into a fibrous reinforcement. The matrix resin is then applied to the fibrous reinforcement in situ such that the curing reaction occurs. The catalyst is delivered to the fibrous reinforcement as a dispersion or solution and therefore must not react with or initiate a reaction of the solvent/dispersal medium. This clearly limits the nature of the catalyst that can be delivered in this way, which in turn limits the nature of the matrix resin. U.S. Pat. No. 2,999,834 also refers to the application of a composition comprising the matrix resin and the catalyst to a fiber reinforcement provided with a catalyst accelerator. In this instance the curing reaction is instantaneous and thus the out-life of the assembly is not prolonged.

EP 0424833 B1 refers to application of a metathesis catalyst to a substrate. The substrate is then placed in a mold and a monomer composition is applied to the substrate such that a curing reaction occurs.

U.S. Pat. No. 3,666,615 refers to a composite sheet material comprising a thermosetting resin layer and a hardening agent layer whereby the two layers are separated by a contact preventative film that melts when heated. A fiber base is embedded in either of the two layers to provide structural support for the composite. Thereby the room temperature out-life of the assembly is prolonged. However, the use of such a barrier film requires using a film of a different type from the thermosetting resin, which complicates the system and increases the costs and the time involved in producing the composite.

SUMMARY OF THE INVENTION

Thus, it is an object of the present invention to provide an uncured fiber reinforced resin assembly for use in sports applications, and in particular for the manufacture of ski/snowboard industry, which has an ambient temperature out-life of at least two weeks and a 'leathery' tack to aid ply cutting and lay up operations, said tack preferably being less than 15 pounds per square inch (psi) as measured by the Meedus tack test.

According to a first aspect of the present invention there is provided an uncured fiber reinforced resin assembly comprising a fibrous reinforcement provided with at least one highly reactive curing agent, said fibrous reinforcement having a matrix film layer applied to at least part of at least one of its surfaces wherein the matrix film layer comprises at least one epoxy resin material together with at least one latent epoxy curing agent and wherein the matrix film layer does not substantially impregnate the fibrous reinforcement.

According to a second aspect of the present invention there is provided the use in the manufacture of ski/snowboard equipment of an uncured fiber reinforced resin assembly comprising a fibrous reinforcement provided with at least one highly reactive curing agent said fibrous reinforcement having a matrix film layer applied to at least part of at least one of its surfaces, wherein the matrix film layer comprises at least one epoxy resin material together with at least one latent epoxy curing agent and wherein the matrix film layer does not substantially impregnate the fibrous reinforcement.

With this arrangement, the advancement into the fibrous reinforcement of the components of matrix film layer is minimized such that the assembly provides the desired handling characteristics and out-life.

DETAILED DESCRIPTION OF THE INVENTION

Figure 1:
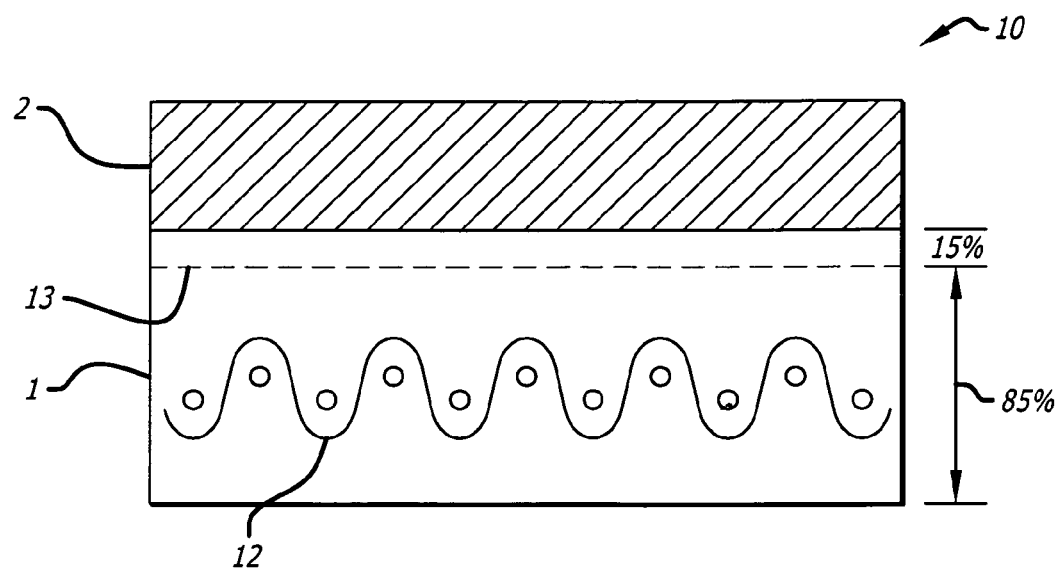
FIG. 1 is a partially schematic cross-sectional view of one embodiment of an uncured fiber reinforced assembly of the present invention.

As referred to herein, a latent epoxy curing agent is one that provides long-term stability to a resin mixture at room temperature, but rapid cure at elevated temperatures. A reactive epoxy curing agent on the other hand, will cause undesirable rapid advancement of a thermosetting resin when stored at ambient temperature. As referred to herein, ambient temperature is considered to be temperatures between about 10° C. and 30° C. and more preferably 20° C. and 25° C.

Advantageously, the assembly of the present invention has an out-life of at least two weeks. Clearly, this is highly beneficial to the transport, storage and use of the assembly. Furthermore, the assembly provides all the necessary components to achieve a desirable composite upon curing. It is not necessary to add further polymer resins and/or curing agents/accelerators to the assembly in situ.

The assembly of the present invention possesses a 'leathery' tack ideal for the manufacture of skis or snowboards such that the preferred epoxy resin materials include bisphenol-A (BPA) and bisphenol-F (BPF) and derivatives thereof. Suitable epoxy resin material will preferably have a functionality of 2 and an epoxy equivalent weight (EEW) value in the range of 6.1 to 0.26 equivalents/kg and more preferably from 4.5 to 1.5 equivalents/kg.

As referred to herein, by 'does not substantially impregnate' it is meant that the matrix film layer preferably impregnates the reinforcement layer by less than 15%, more preferably by less than 10% and most preferably by less than 5%.

In order that the matrix film layer does not substantially impregnate the fibrous reinforcement, the matrix resin materials therein have a preferred minimum viscosity of 100 Pas at ambient temperature. The degree of impregnation was determined by placing a matrix film layer on top of a fabric layer positioned on a flat, smooth surface and leaving it for a period of days at ambient temperature. The impregnation level could be seen by taking observations over a period of days The fibrous reinforcement may be based on synthetic or natural fibers, for example, fiberglass, carbon or aramid (aromatic polyamide) fibers, but the invention is particularly appropriate for fiberglass and carbon fibers. Hybrid or mixed fiber systems may also be envisaged. The use of stretch-broken or selectively discontinuous fibers may be advantageous to facilitate lay-up of the product according to the invention and improve its capability of being shaped.

The mass of fibers within the fibrous reinforcement is preferably in the range from 80 to 4000 g/m$^2$, more preferably in the range from 100 to 2500 g/m$^2$, and most preferably in the range from 150 to 2000 g/m$^2$. For carbon based fibrous reinforcement materials, the number of carbon filaments is in the range from 3000 to 320,000, more preferably in the range from 3,000 to 160,000 and most preferably in the range from 3,000 to 40,000. For fiberglass reinforcements, fibers of 300 to 2400 tex are particularly preferred. The fibers may be in unidirectional form, or as non-woven form, such as multi-axial fabrics or non-crimped fabrics, or may be present as a woven fabric or non-woven mat or fabric or combinations thereof.

The highly reactive curing agent is preferably a solid at room ambient temperature. Suitable highly reactive curing agents which may be used alone or in combination include 2-methylimidazole, 2-ethylimidazole, but preferably 2-phenylimidazole. Typically, the highly reactive curing agent is preferably incorporated into the fibrous reinforcement by way of solvent evaporation. The highly reactive curing agent is dissolved in a suitable solvent, for example methylene chloride, acetone or methyl ethyl ketone. The fibrous reinforcement is then passed through a bath containing the curing agent solution. The solvent is subsequently evaporated off leaving the curing agent dispersed within the fibrous reinforcement.

Preferably, the latent curing agent(s) of the matrix film layer is an aliphatic and/or aromatic amine that is solid at ambient temperature. The most preferred latent curing agent is dicyandiamide.

The matrix film layer may also include an accelerator, which is typically a urone. Suitable accelerators, which may be used alone or in combination include N,N-dimethyl, N'-3,4-dichlorophenyl urea (Diuron), N,N-dimethyl, N'-3-chlorophenyl urea (Monuron), but preferably N,N-(4-methyl-m-phenylene bis[N',N'-dimethylurea] (UR500). The matrix film layer may also include additional ingredients as performance enhancing or modifying agents, for example flexibilizers, toughening agents, accelerators, thermoplastics and core shell rubbers, flame retardants, wetting agents, pigments/dyes, UV absorbers, anti-fungal compounds, fillers, toughening particles and viscosity modifiers. The choice of additional ingredients is dependent upon the desired properties of the assembly.

The matrix film layer typically comprises 25-45% of the combined weight of reinforcement plus matrix. The matrix film layer of the present invention is preferably applied to the fibrous reinforcement by a film transfer process thus providing the assembly described herein. Such processes are well known to those skilled in the art. The curing agents and accelerator are present in quantities sufficient to bring about cure in the desired temperature range. Typically, these materials are all present at a level below 15 parts per hundred of resin.

The fiber reinforced resin assembly as hereinbefore described is manufactured using processes well known to those skilled in the art.

Thus, according to a further aspect of the present invention there is provided a method for curing a fiber reinforced resin assembly comprising a fibrous reinforcement provided with at least one highly reactive curing agent, said fibrous reinforcement having a matrix film layer applied to at least part of at least one of its surfaces, wherein the matrix film layer comprises at least one epoxy resin material together with at least one latent epoxy curing agent and wherein the matrix film layer does not substantially impregnate the fibrous reinforcement and wherein the said assembly is cured at a temperature in the range from 80° C. to 150° C.

Preferably the fiber reinforced resin assembly resin assembly is cured at a press cure cycle of 3 minutes at 130° C. or 15 minutes at 100° C. Of course other press-cure cycles can be used. Thus, according to the fourth aspect of the present invention there is provided a composite article comprising a cured fiber reinforced resin assembly as hereinbefore described. Alternative cure cycles may be employed as appropriate. Vacuum bag and autoclave curing can also be utilized.

In order that the present invention is understood it will now be described by way of the following examples.

EXAMPLE 1

| Component | Weight (%) |
|---|---|
| LZ1523 | 77.40 |
| DLS772 | 10.10 |
| DYHARD 100SH | 3.85 |
| UR500 | 4.80 |
| 2-phenyl-imidazole (2PZ) | 3.85 |

LZ 1523 is an epoxy resin blend available from Huntsman Advanced Materials, Duxford, England. DLS 772 is a standard diglycidyl ether of bisphenol-A, with a functionality (f) of 2, a molecular weight of 384 and an epoxy equivalent weight of 5.2 equiv. per kg and is made by Hexcel Composites Limited, Duxford, England. Dyhard 100SH is a micronized dicyandiamide; and UR500 is a urone curative, both obtained from Degussa, Zurich, Switzerland. The imidazole is from Cornelius, Bishop's Stortford, England.

The imidazole, 2PZ, is incorporated into the fabric, while the other materials are all part of the resin matrix.

Preparation of the Matrix Component:
1. The Dyhard 100SH and the UR500 were dispersed in the DLS772 to form a premix resin using a high-speed disperser.
2. The LZ 1523 was charged to a Winkworth Z-blade mixer at ambient and preheated to 60° C. The premix was added at this temperature and the mix was blended until a uniform consistency was obtained. The mix was subsequently decanted and stored at −18° C. until required.
3. A resin film with a nominal weight of 310 gsm, approximating to a resin content of 37% in the final assembly, was cast onto a release paper using a hot roll coater.

Preparation of the Hardener Component:
4. A 4.5% solution of 2PZ imidazole in acetone was prepared. This solution concentration ensured a nominal 13 g of reactive curative was incorporated in each square meter of fabric.
5. A stitched unidirectional 550 gsm glass fabric was passed through a bath containing the solution from step 4 and subsequently through two ovens to evaporate off the solvent. A surface fleece may optionally be included in this assembly to minimize fiber tow movement and to provide a smoother surface appearance to the cured laminate.
6. Finally, the film prepared in step 3 was lightly tacked onto the surface of the 2PZ -impregnated fabric, ensuring minimum impregnation into the fabric. A polyethylene or silicone coated release paper may be placed as a protector layer on one or both sides of the assembly. The assembly may be supplied in rolls or as cut sheets.

Cure Characteristics:

The fiber reinforced resin assembly displayed suitable activity when cured for 15 minutes at 110° C. or for 3.5 minutes at 130° C. Glass transition temperature (Tg) was used as a measure of the degree of cure of the cured laminates—rectangular DMA specimens, of nominal dimensions 40×5×2 mm, were cut using a diamond tipped wheel Micar saw. Dynamic storage modulus (E') and damping (tan delta) were measured in a TA dynamic mechanical analyzer fitted with a single cantilever head. Dynamic scans were performed at a heating rate of 5° C./min over the temperature range 50° to 275° C. at a frequency of 1 Hz. The results, shown below, and the thermal traces confirmed that the assembly had cured and that it had suitable thermal performance for ski or snowboard component production.

| Cure Cycle | Tg (° C.) Ext. onset E' | Tg (° C.) Tan delta peak |
|---|---|---|
| 15 min. @ 110° C. | 121 | 138 |
| 3.5 min. @ 130° C. | 118 | 140 |

The out-life of the assembly was determined over a 14 day storage period at room temperature. Assemblies were cured for 30 minutes at 100° C. and the Tg and visual aspects of the laminates observed. The Tg showed no drop in value over the storage period and visual inspection of the laminates showed no evidence of voids due to lack of ply-consolidation and other imperfections associated with the processing of aged material. The Tg data indicates that the out-life of this assembly is a minimum of 14 days. The out-life of a conventional fully homogenous prepreg made with the same formulation would be less than 3 days.

| No. of Days @ Room Temperature | Tg (° C.) Ext. onset E' | Tg (° C.) Tan delta peak |
|---|---|---|
| 0 (as made) | 110 | 128 |
| 7 | 114 | 130 |
| 14 | 115 | 128 |

EXAMPLE 2

| Component | Weight (%) |
|---|---|
| GY280 | 43.5 |
| GT7071 | 43.5 |
| DYHARD 100SH | 4.0 |
| UR500 | 5.0 |
| 2-phenyl-imidazole | 4.0 |

GY 280 and GT7071 are both epoxy resins available from Huntsman Advanced Materials.

The imidazole, 2PZ, is incorporated into the fabric, while the other materials are all part of the resin matrix.

Preparation of the Matrix Component:
1. The GY280 and GT7071 resins were charged to a mixing tin and preheated in an air-circulating oven at 80° C. The resins were blended by hand.
2. The tin was transferred to a oil bath preheated at 80° C. The DYHARD 100SH+UR500 were charged to the tin and they were blended into the resins using a mechanical stirrer. The tin was removed from the oil bath and stored at −18° C. until required.
3. A resin film with a nominal weight of 495 gsm, approximating a resin content of 38% in the final assembly, was cast onto a release paper using a hot roll coater.

Preparation of the Hardener Component:
4. A 3.3% solution of 2PZ imidazole in acetone was prepared. This solution concentration ensured that a nominal 20 g of reactive curative was incorporated in each square meter of fabric.

5. An 840 gsm glass fabric was passed through a bath containing the solution from step 4 and subsequently through two ovens to evaporate off the solvent.
6. Finally, the film prepared in step 3 was lightly tacked onto the surface of the 2PZ-impregnated fabric, ensuring minimum impregnation into the fabric. A polyethylene or silicone coated release paper may be placed as a protector layer on one or both sides of the assembly. The assembly may be supplied in rolls or as cut sheets.

The out-life of this assembly was determined over a 14-day period in a similar manner to that described in Example 1. Assemblies were cured for 15 minutes at 110° C. and the Tg (determined by DMA) and visual aspect of the laminates were observed. The data outlined below indicated that the out-life was a minimum of 14 days and may be longer.

| No. of Days @ Room Temperature | Tg (° C.) Ext. onset E' |
|---|---|
| 0 (as made) | 114 |
| 7 | 112 |
| 14 | 115 |

Assemblies of the types described above show comparable mechanical properties such as peel when compared with conventional prepreg (reinforcement fully impregnated with a homogenous matrix resin).

In order that the present invention is understood it will now be described by way of example only with reference to the accompanying drawings in which, FIG. 1 shows an uncured bi-layer assembly 10 comprising a reinforcement layer 1 that includes the reinforcing material (fibers) shown schematically at 12 and the reactive curing agent. The uncured assembly 10 further includes a matrix layer 2 that contains the matrix resin and a latent curing agent. As shown by the phantom line 13, the matrix layer 2 impregnates the reinforcement layer 1 by 15% or less.

Figure 2:
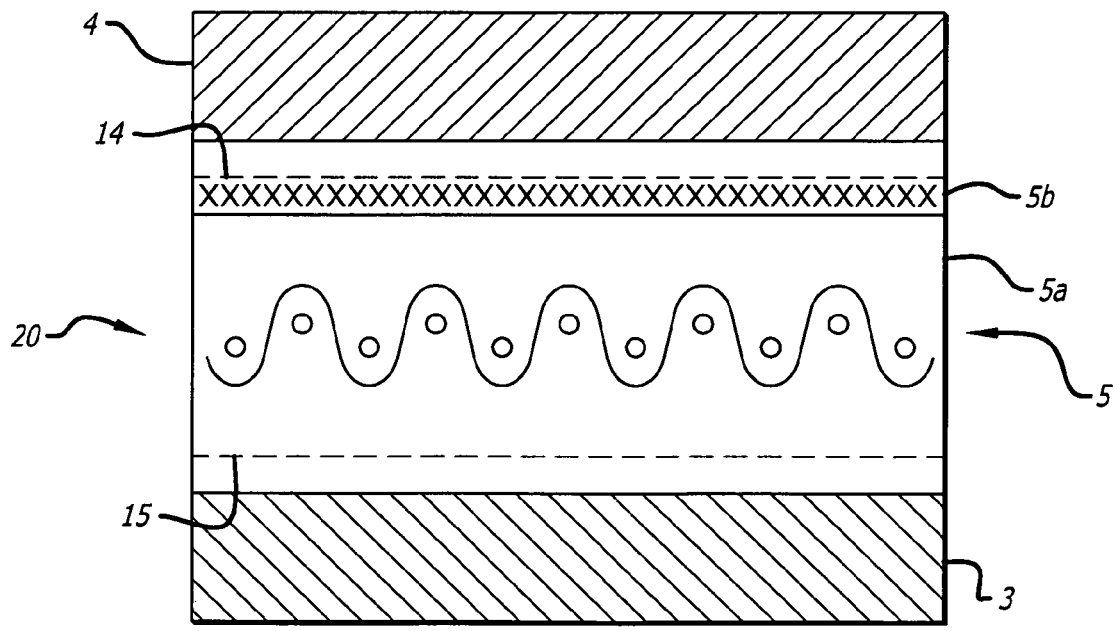
FIG. 2 is a partially schematic cross-sectional view of a further embodiment of an uncured fiber reinforced assembly of the present invention.

FIG. 2 shows an uncured multi-layer assembly 20 that comprises two matrix layers 3 and 5 that each contains resin and a latent curing agent. A reinforcement layer 5 is located between the two resin matrix layers 3 and 5. The reinforcement layer 5 includes an optional surface fleece layer 5b and one or more plies of reinforcing material (fibers) as shown schematically at 5a. The reinforcement layer 5 also includes a reactive curing agent that may be distributed throughout the reinforcement layer 5 or located only in the layer 5a of reinforcing material. The matrix layers 3 and 4 can be the same or different and the latent curing agent(s) can be present in the two layers in differing amounts. Phantom lines 14 and 15 show the depth of impregnation of the matrix resin layers 3 and 5 into the reinforcement layer 5. As mentioned previously, the impregnation should be less than 15%.

Figure 3:
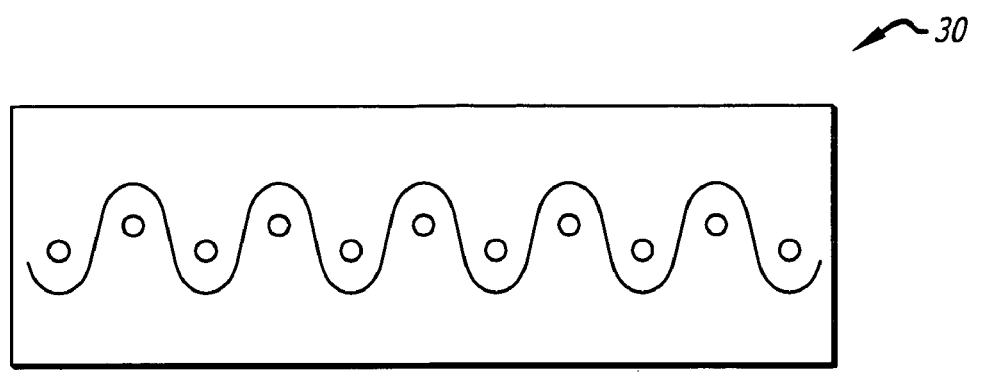
FIG. 3 is a partially schematic cross-sectional view of the uncured fiber reinforced assembly shown in FIG. 1 after it has been cured to form a snowboard or ski.
Figure 4:
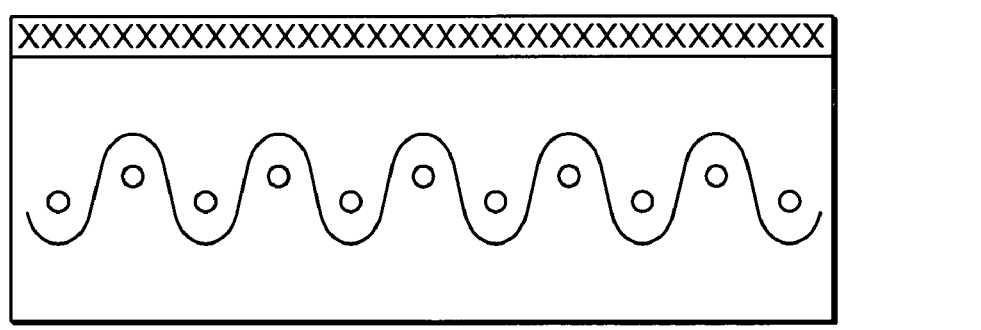
FIG. 4 is a partially schematic cross-sectional view of the uncured fiber reinforce assembly shown in FIG. 2 after it has been cured to form a snowboard or ski.

FIG. 3 shows the assembly 10 after it has been cured to form a snowboard or ski 30. The matrix layer 2 has completely impregnated the reinforcement layer 1 to provide cured composite structure. Likewise, FIG. 4 shows the assembly 20 after it has been cured to form a snowboard or ski 40. The matrix layers 3 and 4 have completely impregnated the reinforcement layer 5 to provide the cured composite structure It is of course to be understood that the invention is not intended to be restricted the details of the above embodiment, which is described only by way of example.

The invention claimed is:

1. An uncured fiber reinforced assembly comprising:
   a reinforcement layer having a first surface and a second surface that define the thickness of said reinforcement layer, said reinforcement layer comprising a fibrous material and at least one highly reactive curing agent; and
   a matrix film layer applied to at least part of said first or second reinforcement layer surfaces wherein said matrix film layer comprises at least one uncured epoxy resin and at least one latent epoxy curing agent and wherein said matrix film layer does not substantially impregnate said reinforcement layer.

2. An uncured fiber reinforced assembly according to claim 1 wherein said matrix film layer impregnates the reinforcement layer by less than 10% of the thickness of said reinforcement layer.

3. An uncured fiber reinforced assembly according to claim 2 wherein said matrix film layer impregnates the reinforcement layer by less than 5% of the thickness of said reinforcement layer.

4. An uncured fiber reinforced assembly according to claim 1 wherein said matrix film layer has a minimum viscosity of 100 Pas at ambient temperature.

5. An uncured fiber reinforced assembly according to claim 1 wherein said fibrous material is selected from the group of fibers consisting of synthetic fibers, natural fibers, hybrid fibers, mixed fibers, stretch-broken fibers and selectively discontinuous fibers.

6. An uncured fiber reinforced assembly according to claim 1 wherein said matrix film layer comprises one or more additional ingredients selected from the group consisting of flexibilizers, toughening agents, accelerators, thermoplastics, core shell rubbers, flame retardants, wetting agents, pigments/dyes, ultra-violet absorbers, anti-fungal compounds, fillers, toughening particles and viscosity modifiers.

7. A composite structure comprising an uncured fiber reinforced assembly according to claim 1 that has been cured to form said composite structure.

* * * * *

UNITED STATES PATENT AND TRADEMARK OFFICE
Certificate

Patent No. 7,223,466 B2

Patented: May 29, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kilian O'Byrne, Cambridge (GB); Philip C. Hadley, Ely (GB); and Chris Harrington, Buckland (GB).

Signed and Sealed this Twenty-seventh Day of July 2010.

Rena L. Dye
*Supervisory Patent Examiner*
Technology Center 1700